US012807142B2

(12) United States Patent
Ooe

(10) Patent No.: US 12,807,142 B2
(45) Date of Patent: Nov. 24, 2026

(54) VEHICLE CONTROL APPARATUS THAT EXECUTES OBSTACLE CONTACT AVOIDANCE CONTROL BASED ON OBJECT TYPE

(71) Applicant: TOYOTA JIDOSHA KABUSHIKI KAISHA, Toyota (JP)

(72) Inventor: Kento Ooe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/045,292

(22) Filed: Feb. 4, 2025

(65) Prior Publication Data

US 2025/0289419 A1 Sep. 18, 2025

(30) Foreign Application Priority Data

Mar. 15, 2024 (JP) ................................ 2024-040772

(51) Int. Cl.
*B60W 30/095* (2012.01)
*B60W 30/09* (2012.01)
(Continued)

(52) U.S. Cl.
CPC ........ *B60W 30/09* (2013.01); *B60W 30/0956* (2013.01); *B60W 50/14* (2013.01);
(Continued)

(58) Field of Classification Search
CPC ...... B60W 30/06; B60W 30/08; B60W 30/09; B60W 50/14; B60W 60/001; B60W 10/18;
(Continued)

(56) References Cited

U.S. PATENT DOCUMENTS 9,707,959 B2 * 7/2017 Suzuki .................. B60W 30/06
10,930,156 B2 * 2/2021 Hayashi ............ B62D 15/0295
(Continued)

FOREIGN PATENT DOCUMENTS

JP 2015-232845 A 12/2015
JP 2021-135191 A 9/2021
(Continued)

OTHER PUBLICATIONS

JP 2024145756 A—machine translation (Year: 2024).*

*Primary Examiner* — Dino Kujundzic
(74) *Attorney, Agent, or Firm* — Oliff PLC

(57) ABSTRACT

A vehicle control apparatus has a controller performing an obstacle contact avoidance control including at least one of warning a driver of a vehicle or a behavior control to change the vehicle behavior, when the vehicle approaches a stationary object located stationarily in a specific place while the vehicle is moving in the place. The controller stores information on the stationary object while distinguishing the stationary object between a normal action required stationary object and an action suppression stationary object, executes the obstacle contact avoidance control, using the stored information, when a distance between the vehicle and the normal action required stationary object becomes equal to or shorter than a first distance threshold, and executes the obstacle contact avoidance control when a distance between the vehicle and the action suppression stationary object becomes equal to or shorter than a second distance threshold which is smaller than the first distance threshold.

5 Claims, 6 Drawing Sheets

(51) Int. Cl.
*B60W 50/14* (2020.01)
*B60W 50/00* (2006.01)

(52) U.S. Cl.
CPC ............... *B60W 2050/0083* (2013.01); *B60W 2050/146* (2013.01); *B60W 2540/215* (2020.02); *B60W 2554/20* (2020.02); *B60W 2554/40* (2020.02); *B60W 2554/80* (2020.02)

(58) Field of Classification Search
CPC ......... B60W 2554/20; B60W 2554/80; B60W 2554/802; B62D 15/027; B62D 15/0285
See application file for complete search history.

(56) References Cited

U.S. PATENT DOCUMENTS

| | | | | |
|---|---|---|---|---|
| 2013/0242101 | A1* | 9/2013 | Schneider | G08G 1/165 382/104 |
| 2015/0307091 | A1 | 10/2015 | Gokan et al. | |
| 2016/0368489 | A1* | 12/2016 | Aich | B60W 10/18 |
| 2017/0088130 | A1 | 3/2017 | Suzuki et al. | |
| 2020/0142400 | A1* | 5/2020 | Kuwabara | G05D 1/0033 |
| 2020/0242936 | A1 | 7/2020 | Matsunaga et al. | |
| 2023/0382369 | A1 | 11/2023 | Maruki et al. | |

FOREIGN PATENT DOCUMENTS

| | | | | |
|---|---|---|---|---|
| JP | 7176421 | B2 | 11/2022 | |
| JP | 2023-176547 | A | 12/2023 | |
| JP | 2024145756 | A * | 10/2024 | B60W 30/06 |
| WO | 2014/083787 | A1 | 6/2014 | |
| WO | 2018/235274 | A1 | 12/2018 | |

* cited by examiner

VEHICLE CONTROL APPARATUS THAT EXECUTES OBSTACLE CONTACT AVOIDANCE CONTROL BASED ON OBJECT TYPE

TECHNICAL FIELD

The present disclosure relates to a vehicle control apparatus, a vehicle control method, and a non-transitory computer-readable medium having stored a program thereof, for executing a vehicle control (e.g., obstacle contact avoidance control including a warning and/or a behavior control to change a behavior of the vehicle) to avoid a contact (i.e., a minor collision) between a vehicle and an object when the vehicle approaches the object.

BACKGROUND

A conventional apparatus distinguishes/discriminates between an "object which is unable to move and which a vehicle have to approach when the vehicle is being parked at a specific place (e.g., a stationary object such as a fence and a wall)" and an "object which is able to move (e.g., a non-stationary object such as a bicycle and a motorcycle)", based on a difference between an image (picture) around the vehicle taken in the past and an image (picture) around the vehicle taken currently.

Furthermore, the conventional apparatus performs the obstacle contact avoidance control when a distance between the vehicle and the non-stationary object is equal to or smaller/shorter than a "set distance for a non-stationary object". The obstacle contact avoidance control includes at least warning to a driver and a behavior control to change a behavior of the vehicle (e.g., an automatic braking control to brake the vehicle). In addition, the conventional apparatus performs the obstacle contact avoidance control when a distance between the vehicle and the stationary object is equal to or smaller/shorter than a "set distance for a stationary object" which is smaller/shorter than the "set distance for a non-stationary object". This can reduce a frequency that the driver feels annoyed by the obstacle contact avoidance control when the vehicle is being parked, since the obstacle contact avoidance control is not performed unless the vehicle considerably approaches the stationary object (namely, unless the distance between the vehicle and the stationary object becomes equal to or smaller/shorter than the set distance for a stationary object) (refer to Japanese Patent Application Laid-Open No. 2015-232845).

SUMMARY

As shown in FIG. 3A, the stationary object includes two types. One is an "action suppression stationary object (e.g., a wheel stopper WS)" for which the obstacle contact avoidance control is not necessary to be executed until the vehicle considerably approaches it. The other is a "normal action required stationary object (e.g., a wall WL)" for which the obstacle contact avoidance control is necessary to be executed when the vehicle approaches it to some extent. However, the conventional apparatus executes the obstacle contact avoidance control without distinguishing/discriminating between the action suppression stationary object and the normal action required stationary object, and therefore, the driver may still feel annoyed by the obstacle contact avoidance control that is executed for the action suppression stationary object. This disclosure is made to cope with this problem.

A vehicle control apparatus according to an embodiment of the present disclosure comprises a controller (10) which is configured to perform an obstacle contact avoidance control including at least one of warning to a driver of a vehicle or a behavior control to change a behavior of the vehicle, when the vehicle approaches to a stationary object which is an object located stationarily in a specific place while the vehicle is moving in the specific place.

The controller is configured to:

- store information on the stationary object while distinguishing the stationary object between a normal action required stationary object and an action suppression stationary object (S455);
- execute the obstacle contact avoidance control, using the stored information, when a distance between the vehicle and the normal action required stationary object becomes equal to or shorter than a first distance threshold (D1th) (S525, S530); and
- execute the obstacle contact avoidance control, using the stored information, when a distance between the vehicle and the action suppression stationary object becomes equal to or shorter than a second distance threshold (D2th) which is smaller than the first distance threshold (S535, S540).

According to the above-described embodiment, with respect to the normal action required stationary object for which the the obstacle contact avoidance control is preferably executed at an early timing, the obstacle contact avoidance control is executed when the vehicle approaches the normal action required stationary object to the first distance threshold. Whereas, the driver feels annoyed by the obstacle contact avoidance control, if the obstacle contact avoidance control is executed relatively early for the action suppression stationary object. Thus, according to the above-described embodiment, with respect to the action suppression stationary object, the obstacle contact avoidance control is executed when the vehicle approaches the action suppression stationary object to the second distance threshold that is smaller than the first distance threshold. Thus, the frequency that the driver feels annoyed by the obstacle contact avoidance control can be reduced.

In the above-described embodiment, the controller is configured to:

- causes a display (93) which the vehicle includes to display an image in which the stationary objects are superimposed on a viewpoint image which is an image of the vehicle viewed from a predetermined viewpoint above the vehicle (S455); and
- let the driver select one of the displayed stationary objects and designate which of the normal action required stationary object and the action suppression stationary object, the selected stationary object is (S445).

According to the above-described embodiment, since the driver himself/herself can set/designate which of the action suppression stationary object and/or the action suppression stationary object, the stationary object is, the obstacle contact avoidance control can be started at a timing in accordance with the driver's preference.

In the above-described embodiment, the controller is configured to execute the obstacle contact avoidance control, using the stored information, when a distance between the vehicle and a non-stationary object which is neither the action suppression stationary object nor the normal action required stationary object becomes shorter than a third distance threshold which is equal to or greater than the first distance threshold (S545, S550).

It is preferable that the obstacle contact avoidance control is executed relatively early for the non-stationary object, because it is hard for the driver to predict that the non-stationary object is present. According to the above-described embodiment, the obstacle contact avoidance control is executed when the vehicle approaches to the non-stationary object to the third distance threshold. Therefore, a possibility that the vehicle contacts with the non-stationary can be reduced.

Notably, in the above description, in order to facilitate understanding of the present disclosure, the constituent elements corresponding to those of an embodiment which will be described later are accompanied by parenthesized symbols and/or names which are used in the embodiment; however, the constituent elements of the disclosure are not limited to those in the embodiment defined by the symbols and/or names. The present disclosure also covers a vehicle control method and a non-transitory computer readable medium having stored program thereof.

DETAILED DESCRIPTION (Configuration)

A vehicle control apparatus (hereinafter, referred to as an "implementing apparatus") according to an embodiment of the present disclosure is applied to (i.e., is mounted on) a vehicle (namely, a host vehicle) HV shown in FIG. 2, FIG. 3A, and so on. The vehicle HV may be a vehicle having an internal combustion engine as a drive source, a vehicle having an electric motor as the drive source (namely, an electric vehicle), or a hybrid vehicle.

Figure 1:
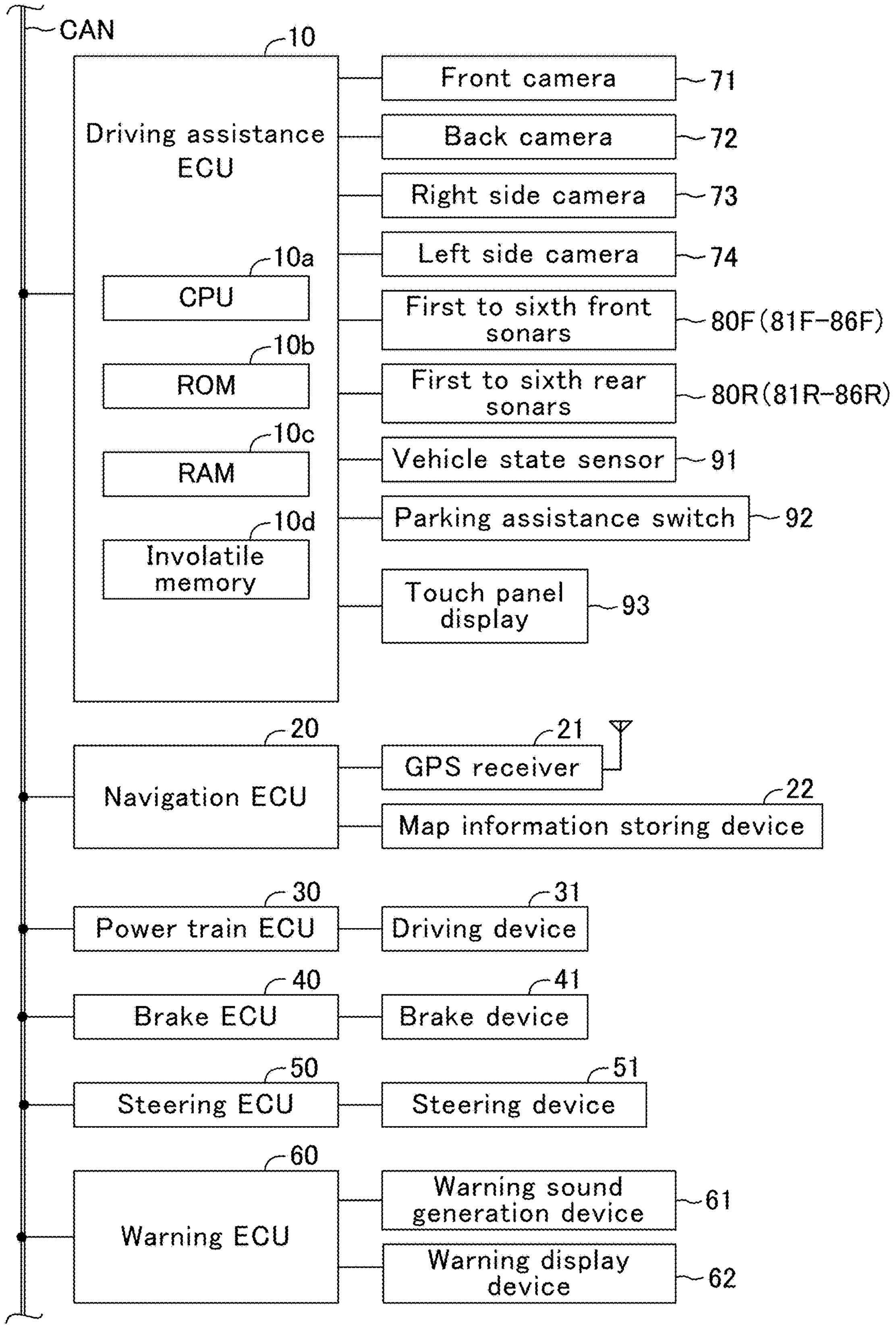
FIG. 1 is a schematic diagram of a vehicle control apparatus according to an embodiment of the present disclosure.

As shown in FIG. 1, the implementing apparatus comprises a driving assistance ECU 10, a navigation ECU 20, a power train ECU 30, a brake ECU 40, a steering ECU 50, and a warning ECU 60.

In the present specification, an ECU means an electronic control device (i.e., a control unit) comprising a microcomputer. The microcomputer comprises a CPU (i.e., processor), a ROM (i.e., a non-transitory computer readable medium), a RAM, data writable involatile memory, and an interface (I/F). The CPU realizes various functions by executing instructions (routines) stored in the memory (i.e., the ROM). The ECU is referred to as a controller or a computer. The above-described ECUs are connected to each other through Controller Area Network (CAN) in such a manner that they can exchange data with each other. All or some of a plurality of these ECUs are integrated into a single ECU. In addition, one of the ECUs may be implemented by a plurality of ECUs.

The driving assistance ECU 10 comprises a CPU 10*a*, a ROM 10*b*, a RAM 10*c*, and an involatile memory 10*d*. The driving assistance ECU 10 receives, every time a predetermined time elapses, signals form a front camera 71, a back camera 72, a right side camera 73, a left side camera 74, a first to sixth front sonars 80F, a first to sixth rear sonars 80R, a vehicle state sensor 91, and a parking assistance switch 92. The d riving assistance ECU 10 is connected with a touch panel display 93 to control images displayed on the display 93.

Figure 2:
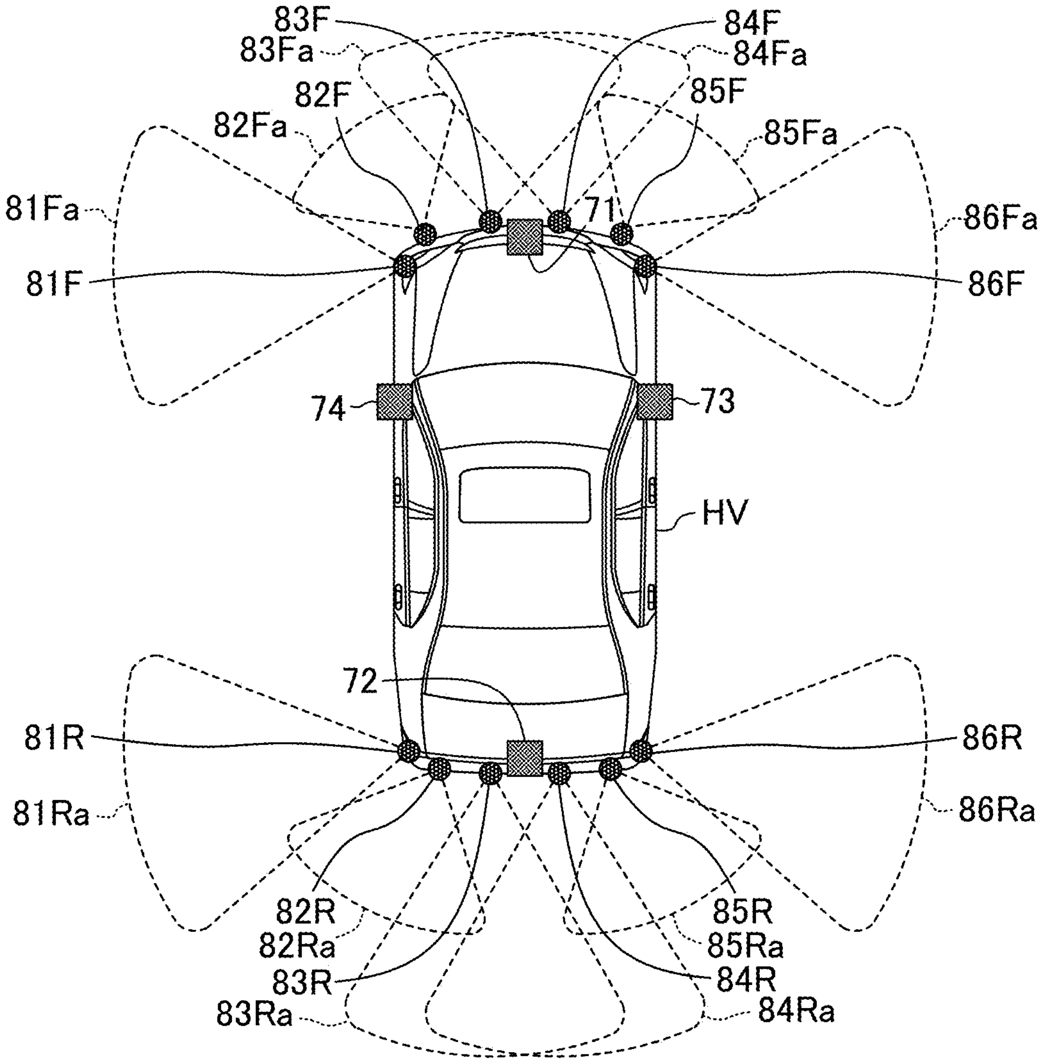
FIG. 2 is a plan view of a vehicle on which the vehicle control apparatus according to the embodiment of the present disclosure is mounted.

The cameras 71-74 are disposed at respective positions shown in FIG. 2. Each of the cameras 71-74 comprises a wide-angle lens.

The front camera 71 takes a picture of a front scene of the vehicle to produce a front wide angle image data.

The back camera 72 takes a picture of a rear scene of the vehicle to produce a rear wide angle image data.

The right side camera 73 takes a picture of a rightward scene of the vehicle to produce a rightward wide angle image data.

The left side camera 74 takes a picture of a leftward scene of the vehicle to produce a leftward wide angle image data.

The driving assistance ECU 10 generates/produces, based on the image data from the cameras 71-74, a surrounding image indicating a surrounding of the vehicle, every time a predetermined time elapses, and causes the display 93 to display the surrounding image. The surrounding image includes a viewpoint image which is an image of the vehicle HV viewed from a predetermined viewpoint above the vehicle HV (including a bird's eye view image) and an image (i.e., travel direction image) in the direction in which the vehicle is traveling.

The driving assistance ECU 10 performs an image analysis processing on the surrounding image to detect (extract/recognize) feature points included in the surrounding image. The driving assistance ECU 10 groups the feature points for "a three-dimensional structure, a set of patterns on the road/ground surface, and a demarcation line on the road/ground surface". The driving assistance ECU 10 obtains, as feature point information, a "shape" of the grouped feature points and a "positional relationship" between the grouped feature points and the vehicle HV, and stores them in the involatile memory 10*d*.

The first to sixth front sonars 80F includes the first to sixth front sonars 81F-86F that are disposed at the front end of the vehicle HV, as shown in FIG. 2. The first to sixth rear sonars 80R includes the first to sixth rear sonars 81R-86R that are disposed at the rear end of the vehicle HV, as shown in FIG. 2. Object detection areas (i.e., ultrasonic wave irradiation areas) of these sonars are denoted by 81Fa to 86Fa, and 81Ra to 86Ra, respectively. For example, the area denoted by 81Fa is the object detection area of the first front sonar 81F.

Each sonar irradiates an ultrasonic wave to the respective object detection area, and receives a reflection wave. The object generates the reflection wave by reflecting the irradiated ultrasonic wave. Each sonar transmits, to the driving assistance ECU 10, sonar information including a time length from a time point at which it starts to irradiate the ultrasonic wave to a time point at which it receives the reflection wave. The driving assistance ECU 10 obtains sonar object information indicative of a position of a reflection point with respect to the vehicle HV, based on the sonar information from each of the sonars and the triangulation method.

The driving assistance ECU 10 fuses/integrates the feature point information and the sonar object information to obtain a final position of the object (hereinafter, sometimes referred to as an "object position with respect to the vehicle") (refer to Japanese Patent Application Laid-Open No. 2021-135191, for example).

The vehicle state sensor 91 includes various sensors to obtain parameters indicative of a state of the vehicle HV. For example, the vehicle state sensor 91 includes a vehicle speed sensor which detects a vehicle speed (i.e., a host vehicle speed) Vh, a shift position sensor, a steering angle sensor, a steering torque sensor, an acceleration pedal operation amount sensor, and a brake pedal operation amount sensor.

The parking assistance switch is operated by the driver of the vehicle HV for the driver to require various parking assistances provided by the driving assistance ECU 10 when the driver parks the vehicle HV.

The touch panel display 93 displays various images including touch buttons and the above-described surrounding image.

The navigation ECU 20 constitutes a well-known navigation system together with a GPS receiver 21 and a map information storing device 22. The navigation ECU 20 obtains a "current position of the vehicle HV" represented by a latitude and a longitude, based on the GPS signals (i.e., signals from positioning satellites) which the GPS receiver 21 receives.

The power train ECU 30 controls a driving device 31 including the drive source of the vehicle HV, so as to adjust a driving force of the vehicle HV. The brake ECU 40 controls a brake device 41, so as to adjust a brake force applied to the vehicle HV. The steering ECU 50 controls a steering device 51 of the vehicle HV, so as to change a steering assist force and the steering angle of the vehicle HV.

The warning ECU 60 causes the warning sound generation device 61 to generate a warning sound (i.e., a notification sound), and causes the warning display device 62 that is disposed at a position which is visible from a driver's seat to display a warning figure (i.e., a notification icon), in response to instructions from the driving assistance ECU 10

(Outline of Operation)

For example, the vehicle HV is repeatedly parked into a parking space in a specific place, such as a parking space of the home or a parking space at the office, and/or is started to move from the parking space in the specific place. As shown FIG. 6A, in such a place, there is often a "stationary object which is an object that does not move (i.e., that is fixed)", such as a wall WL, a fence FE, and a hedge HD.

Figure 3A:
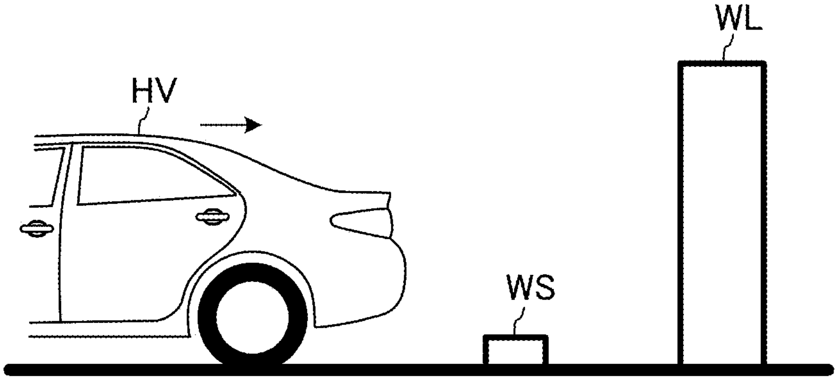
FIG. 3A is a side view of the vehicle, the action suppression stationary object, and the normal action required stationary object, to show an example of a positional relationship among them.

As shown in FIG. 3A, the stationary object includes two types. One is the "action suppression stationary object (e.g., a wheel stopper WS" for which the obstacle contact avoidance control (e.g., warning and braking) is not necessary to be executed until the vehicle considerably approaches it. The other is the "normal action required stationary object (e.g., a wall WL)" for which the obstacle contact avoidance control is necessary to be executed when the vehicle approaches it to some extent.

However, the conventional apparatus executes the obstacle contact avoidance control without distinguishing/discriminating between the action suppression stationary object and the normal action required stationary object. Therefore, the driver may feel annoyed by the obstacle contact avoidance control that is executed for the action suppression stationary object.

Figure 6A:
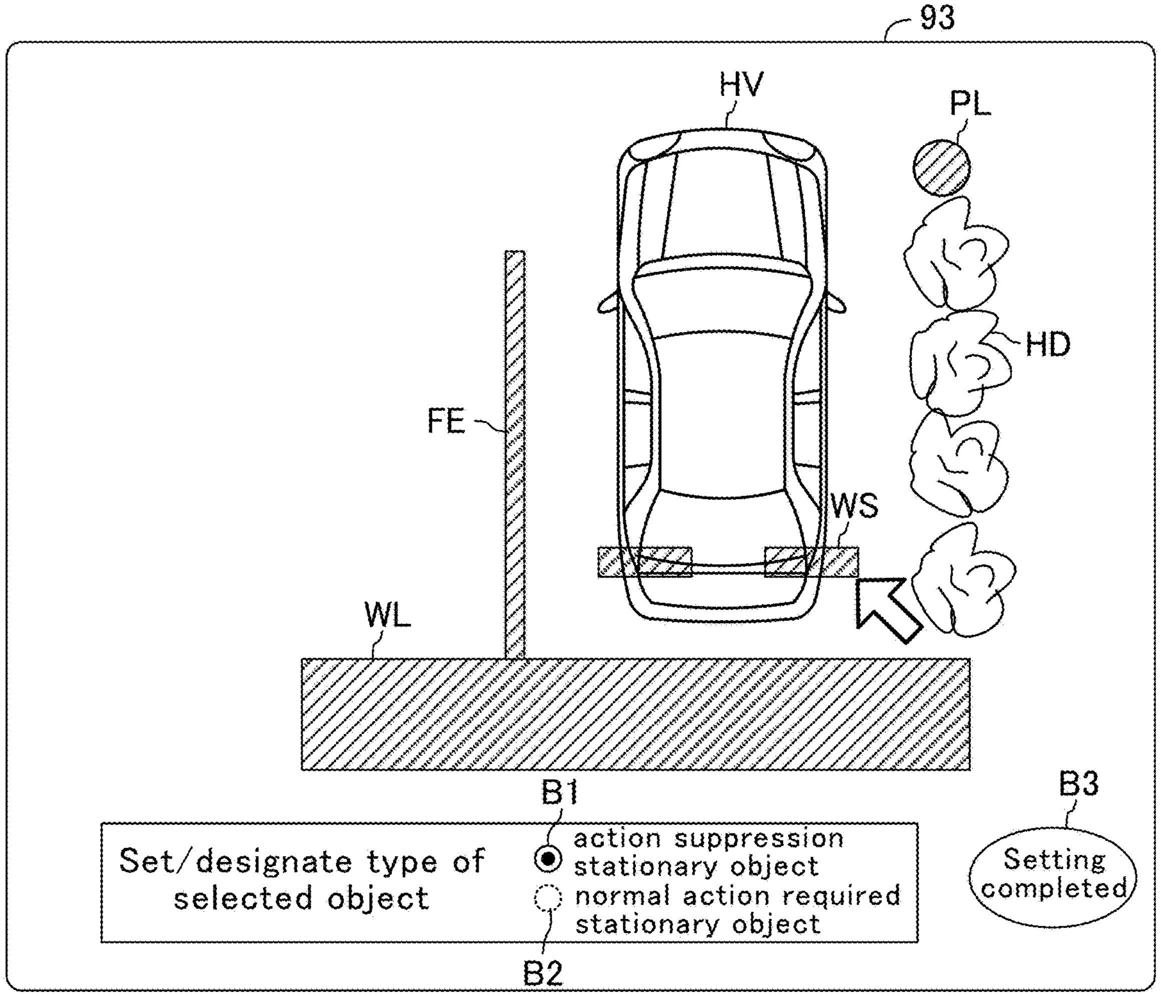
FIG. 6A shows an example of an image (screen) displayed on the touch panel display shown in FIG. 1.

In view of the above, the present implementing apparatus displays stationary object(s) that is (are) located in the specific place on the display 93, as shown in FIG. 6A, to let the driver designate (set) whether the stationary object is either "the action suppression stationary object or the normal action required stationary object". Namely, the present implementing apparatus lets the driver distinguish/discriminate between the action suppression stationary object and the normal action required stationary object, and designate/set a type of the stationary object. Then, the present implementing apparatus stores/memorizes the type of the stationary object. Thereafter, while the vehicle HV travels/moves in the specific place, the present implementing apparatus executes the obstacle contact avoidance control when a distance between the vehicle HV and the stored normal action required stationary object becomes equal to or shorter than a first distance threshold, and executes the obstacle contact avoidance control when a distance between the vehicle HV and the stored action suppression stationary object becomes equal to or shorter than a "second distance threshold which is shorter/smaller than the first distance threshold". This enables the obstacle contact avoidance control to be executed for the normal action required stationary object with reliability. This can also reduce a frequency that the obstacle contact avoidance control is executed unnecessarily for the action suppression stationary object.

(Specific Operation)

1. Designation/Setting of the Type of the Stationary Object

The CPU 10*a* of the driving assistance ECU 10 (hereinafter, simply referred to as a "CPU") executes a routine shown by a flowchart in FIG. 4, every time a predetermined time elapses. Hereinafter, "step" is expressed as "S". When an appropriate time point comes, the CPU starts processing from S400 shown in FIG. 4, and proceeds to S405. At S405, the CPU determines whether or not the vehicle HV is located/present in the vicinity area of a registered parking position (i.e., in the specific place). Specifically, the CPU determines whether or not a distance between "the current position of the vehicle HV obtained based on the GPS signal" and "a registered parking point, represented by a latitude and a longitude, which specify a registered parking position" that has been stored in the involatile memory is equal to or shorter than a predetermined distance, to determine whether or not the vehicle HV is located/present in the specific place. Note that, a method to register the registered parking position and the registered parking point will be described later.

When the vehicle HV is located/present in the vicinity area of the registered parking position (i.e., the specific place), the CPU makes a "Yes" determination at step 405 to execute processes from S410 to S420, sequentially. Thereafter, the CPU proceeds to S425.

S410: The CPU obtains the feature point information based on the image data from the cameras 71-74.

S415: The CPU obtains the sonar object information based on the sonar information from the first to sixth front sonars 80F and the first to sixth rear sonars 80R.

S420: The CPU obtains the "object position with respect to the vehicle" based on the feature point information and the sonar object information, and store the obtained "object position with respect to the vehicle" in the RAM.

The CPU determines whether or not parking of the vehicle HV has been completed at S425. Specifically, the CPU determines whether or not the current time point is immediately after a time point at which the shift position is changed from the range other than the parking range (P) to the parking (P) range while the vehicle speed Vh is equal to "0". When the parking of the vehicle HV has not been completed, the CPU directly proceeds to S495 from S425 to terminate the present routine tentatively. As a result, when the vehicle HV is located in the vicinity area of the registered parking position and the parking of the vehicle HV has not been completed, the processes from S410 to S420 are repeated, and thus, the "object position with respect to the vehicle" is stored/accumulated in the RAM every time the predetermined time elapses.

When the parking of the vehicle HV has been completed at the time point at which the CPU proceeds to S425, the CPU proceeds to S430 from S425. At S430, the CPU specifies "the object position with respect to a position of the vehicle HV which is in the parking state", based on "the object positions with respect to the vehicle" which have been stored in the RAM. Hereinafter, the position of the vehicle HV which is in the parking state may sometimes be referred to as a "parking position". In addition, the CPU stores the specified "object position with respect to the parking position" in the involatile memory 10*d*. The "object position with respect to the parking position" stored in the involatile memory 10*d* may sometimes be referred to as a "current object position".

Subsequently, the CPU proceeds to S435. At S435, the CPU determines whether or not the "object position with respect to the parking position" has been stored in the involatile memory 10*d* prior to the time point at which the above-described current object position is stored in the involatile memory 10*d*. Namely, the CPU determines whether or not the "past object position" (i.e., the current object position that was obtained in the past) has been stored in the involatile memory 10*d*. When the past object position has not been stored in the involatile memory 10*d*, the CPU directly proceeds to S495 to terminate the present routine tentatively.

Whereas, when the past object position has been stored in the involatile memory 10*d*, the CPU proceeds to S440 from S435. At S440, the CPU specifies an "object that cannot move (i.e., the stationary object)" based on the current object position and the past object position. Specifically, the CPU specifies/regards an object whose position has not changed between the current object position and the past object position, as the stationary object.

Thereafter, the CPU proceeds to S445, and displays the "stationary object(s) specified at S440" on the display 93, as shown in FIG. 6A. At this moment, the CPU displays the stationary object(s) in such a manner that the driver can recognize the position of each stationary object with respect to the vehicle HV which is located at the parking position. In the present example, the stationary object(s) is/are displayed in such a manner that the stationary object(s) is/are superimposed on the bird's eye view image. It should be noted that the stationary object(s) may be displayed in such a manner that the stationary object is superimposed on the viewpoint image which is the image of the vehicle HV viewed from the predetermined viewpoint above the vehicle HV.

In addition, at S445, the CPU lets the driver of the vehicle HV set (designate) the type of each of the "stationary object(s) displayed on the display 93". Specifically, the CPU displays the stationary object(s) on the display 93 in such a manner that the driver can specify/select one of the stationary object(s) displayed on the display 93 by touching it on the display 93, and in such a manner that the driver can set/designate whether the specified/selected stationary object is the action suppression stationary object or the normal action required stationary object. In the example shown in FIG. 6A, the driver selects the wheel stopper WS which is one of the stationary objects using an open arrow (i.e., a cursor). The driver touches (carries out the touching operation to) the button B1 among the button B1 and the button B2 to set/designate the type of the wheel stopper WS to the action suppression stationary object. In this manner, the driver touches one of the displayed stationary objects (i.e., the wall WL, the fence FE, the hedge HD, and the pole PL) to select that stationary object, and touches either one of the button B1 and the button B2 (with respect to that selected stationary object) to set/designate the type of the selected stationary object. Note that the stationary object whose type is not set/designated is automatically set to the normal action required stationary object.

Subsequently, the CPU proceeds to S450 to determine whether or not setting/designating the type of the displayed stationary object(s) has been completed. Specifically, when the driver touches a setting completion button B3 shown in FIG. 6A, the CPU determines that the setting/designating the type of the displayed stationary object(s) has been completed. Furthermore, the CPU determines that the setting/designating the type of the displayed stationary object(s) has been completed, when a constant time has elapsed since a time point at which the stationary object(s) specified at S440 starts to be displayed on the display 93, even if the setting completion button B3 has not been touched.

When the setting/designating the type of the displayed stationary object(s) has not been completed yet, the CPU returns to S445 from S450. Whereas, when the CPU determines that the setting/designating the type of the displayed stationary object(s) has been completed, the CPU proceeds to S455 from S450. At S455, the CPU stores "stationary object type specifying information" in the involatile memory 10*d* while associating the stationary object type specifying information with the respective position(s) of the stationary object(s) whose type is specified by the stationary object type specifying information. The stationary object type specifying information is information which identifies which the type of each of the stationary objects is, the action suppression stationary object or the normal action required stationary object, according to the setting/designation of the type of the stationary object(s) performed at S445. Thereafter, the CPU proceeds to S495.

Note that, when the CPU makes a "No" determination at any of the steps of S405, S425, and S435, the CPU directly proceeds to S495 from the step at which the the CPU makes the "No" determination.

2. A Vehicle Control to Avoid a Contact with an Obstacle (i.e., an Obstacle Contact Avoidance Control)

Figure 5:
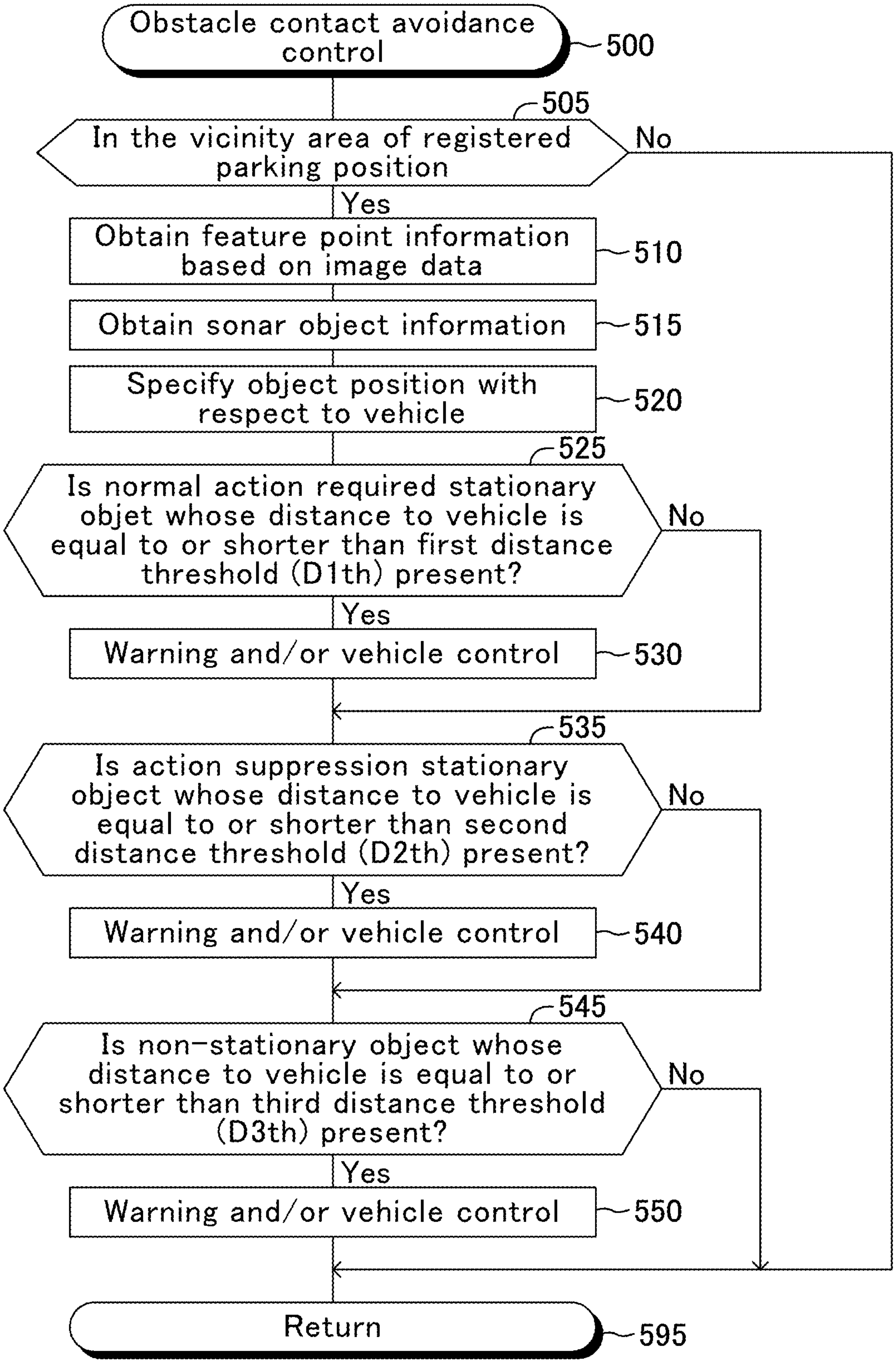
FIG. 5 shows another routine executed by the CPU of the vehicle control ECU shown in FIG. 1.

The CPU executes a routine shown by a flowchart in FIG. 5, every time a predetermined time elapses. When an appropriate time point comes, the CPU starts processing from S500 shown in FIG. 5, and proceeds to S505. At S505, the CPU determines whether or not the vehicle HV is located/traveling in the vicinity area of the registered parking position, similarly to S405. Namely, the CPU determines whether or not the vehicle HV is located in the specific place.

When the vehicle HV is located/traveling in the vicinity area of the registered parking position, the CPU makes a "Yes" determination at S505 to execute processes from S510 to S520 described below, sequentially, and proceeds to S525.

- S510: The CPU obtains the feature point information based on the image data from the cameras 71-74, similarly to S410.
- S515: The CPU obtains the sonar object information based on the sonar information from the first to sixth front sonars 80F and the first to sixth rear sonars 80R, similarly to S415.
- S520: The CPU obtains the "object position with respect to the vehicle" based on the feature point information and the sonar object information, and store the obtained "object position with respect to the vehicle" in the RAM, similarly to S420.

Figure 4:
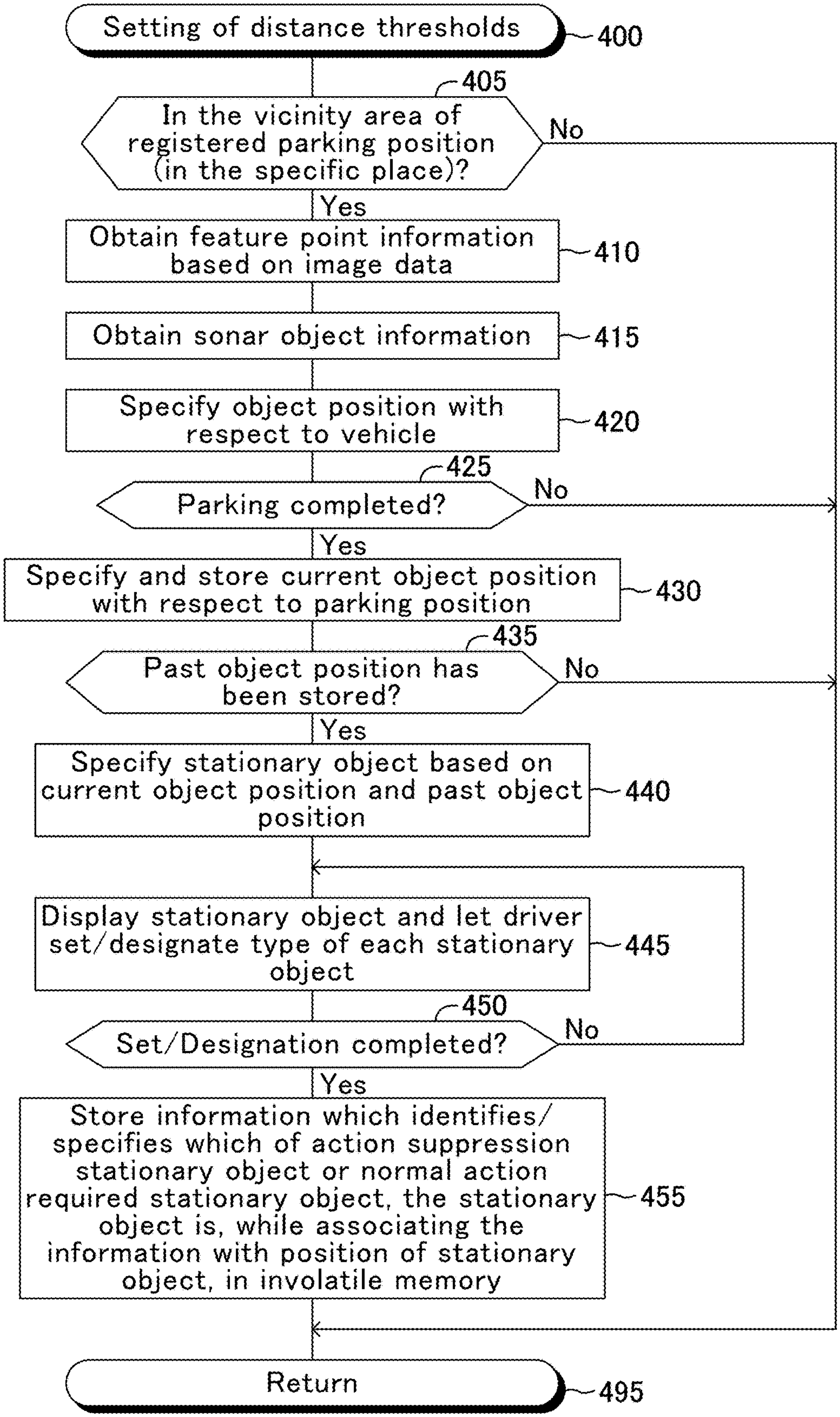
FIG. 4 shows a routine executed by a CPU of the vehicle control ECU shown in FIG. 1.
Figure 6B:
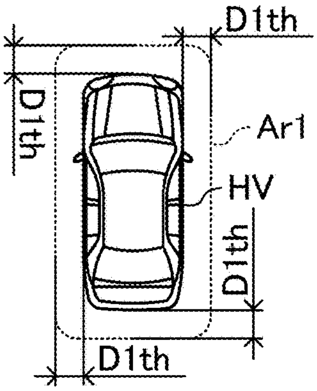
FIG. 6B shows a relationship between the vehicle and distance thresholds.

At S525, the CPU determines whether or not the "normal action required stationary object" whose distance to the vehicle HV is equal to or shorter than a first distance threshold D1th is present, based on the object position with respect to the vehicle, the position of the stationary object that has been stored in the involatile memory 10*d* at S455 shown in FIG. 4, and the stationary object type specifying information. Namely, the CPU determines whether or not the normal action required stationary object is present within an area Ar1 shown by a broken line in FIG. 6B. When the "normal action required stationary object" whose distance to the vehicle HV is equal to or shorter than the first distance threshold D1th is not present, the CPU directly proceeds to S535 from S525.

Whereas, when the "normal action required stationary object" whose distance to the vehicle HV is equal to or shorter than the first distance threshold D1th is present, the CPU proceeds to S530 from S525. At S530, the CPU causes the warning sound generation device 61 to generate the warning sound, and causes the warning display device 62 to display the warning figure (sign). Namely, the CPU performs warning. Note that, at S530, the CPU may perform the behavior control to apply a brake force to the vehicle HV through the brake ECU 40 to fully stop the vehicle HV. In this manner, at S530, the CPU executes the vehicle control (i.e., the obstacle contact avoidance control) including at least one of the warning to the driver of the vehicle HV or the behavior control to change the behavior of the vehicle HV. Thereafter, the CPU proceeds to S535.

Figure 6C:
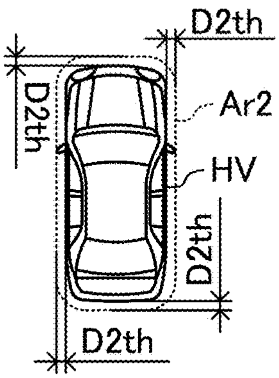
FIG. 6C shows another relationship between the vehicle and distance thresholds.

At S535, the CPU determines whether or not the "action suppression stationary object" whose distance to the vehicle HV is equal to or shorter than a second distance threshold D2th is present, based on the object position with respect to the vehicle, the position of the stationary object that has been stored in the involatile memory 10*d* at S455 shown in FIG. 4, and the stationary object type specifying information. Namely, the CPU determines whether or not the action suppression stationary object is present within an area Ar2 shown by a broken line in FIG. 6C. The second distance threshold D2th is shorter/smaller than the first distance threshold D1th. When the "action suppression stationary object" whose distance to the vehicle HV is equal to or shorter than the second distance threshold D2th is not present, the CPU directly proceeds to S545 from S535.

When the "action suppression stationary object" whose distance to the vehicle HV is equal to or shorter than the second distance threshold D2th is present, the CPU proceeds to S540 from S535. At S540, the CPU executes the vehicle control (i.e., the obstacle contact avoidance control) including at least one of the warning to the driver of the vehicle HV or the behavior control to change the behavior of the vehicle HV, similarly to S530. Thereafter, the CPU proceeds to S545.

Figure 3B:
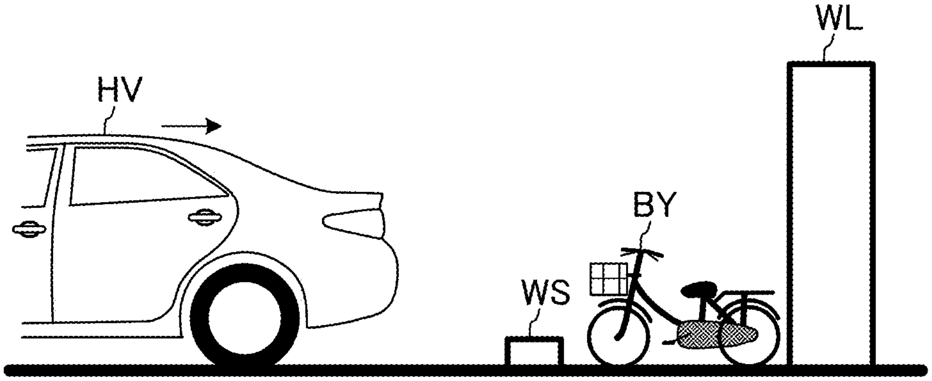
FIG. 3B is a side view of the vehicle, the action suppression stationary object, the normal action required stationary object, and the non-stationary object, to show an example of a positional relationship among them.
Figure 6D:
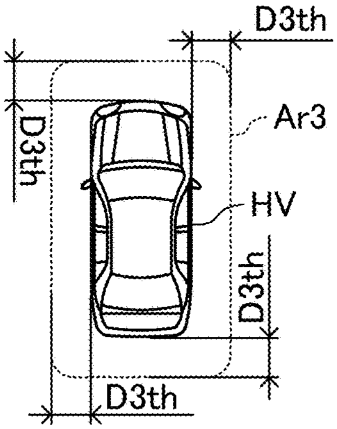
FIG. 6D shows yet another relationship between the vehicle and distance thresholds.

At S545, the CPU specifies the non-stationary object (that is an object which is neither the action suppression stationary object nor the normal action required stationary object), based on the object position with respect to the vehicle, the position of the stationary object that has been stored in the involatile memory 10*d* at S455 shown in FIG. 4, and the stationary object type specifying information. Thereafter, the CPU determines whether or not the non-stationary object (e.g., a bicycle BY shown in FIG. 3B) whose distance to the vehicle HV is equal to or shorter than a third distance threshold D3th is present. Namely, the CPU determines whether or not the non-stationary object is present within an area Ar3 shown by a broken line in FIG. 6D. The third distance threshold D3th is equal to or longer/greater than the first distance threshold D1th. When the non-stationary object whose distance to the vehicle HV is equal to or shorter than the third distance threshold D3th is not present, the CPU directly proceeds to S595 from S545 to terminate the present routine tentatively.

Whereas, when the non-stationary object whose distance to the vehicle HV is equal to or shorter than the third distance threshold D3th is present, the CPU proceeds to S550 from S545. At S550, the CPU executes the vehicle control (i.e., the obstacle contact avoidance control) including at least one of the warning to the driver of the vehicle HV or the behavior control to change the behavior of the vehicle HV, similarly to S530. Thereafter, the CPU proceeds to S595.

3. A Method for Registering the Registered Parking Position and a Method for Parking the Vehicle to the Registered Parking Position The driving assistance ECU 10 comprises, as its functions, a parking path generation section, a parking assistance execution section, and a target parking point registration section.

The parking path generation section searches for a space (i.e., a parking passible space) into which the vehicle HV can be parked, based on the above-described feature point information, the sonar object information, and/or radar object information obtained by unillustrated radar sensors. The parking path generation section sets a candidate target parking space(s) in the searched space (i.e., the parking possible space) into which the vehicle HV can be parked. The parking path generation section causes the display 93 to display an image in which the candidate target parking space(s) is/are superimposed on the bird's eye view image, and an image in which the candidate target parking space(s) is/are superimposed on the travel direction image.

When one of the candidate target parking spaces is determined as a "parking space into which the vehicle should be parked (i.e., as the target parking space)" by a certain operation to the display 93 by the driver, the parking path generation section generates a path, as a target parking path, from the current position of the vehicle to the target parking space.

When a parking assistance start button displayed on the display 93 is operated in a state where the target parking path has been generated, the parking assistance execution section instructs the driver how to operate the acceleration peal, the brake pedal, the shift lever, and the steering wheel, so that the vehicle HV moves/travels along the target parking path.

When the target parking point registration section determines that parking of the vehicle HV is completed after the parking assistance start button was operated, and when the driver operates a parking position registration button displayed on the display 93, the target parking point registration section obtains the current position/point (represented by a latitude and a longitude) of the vehicle which is being in the parked state from the navigation ECU 30. The target parking position registration section stores/registers the obtained current position/point of the vehicle in the involatile memory 10*d* of the driving assistance ECU 10, as a registered parking point.

The target parking point registration section stores the above-described feature point information obtained in a parking assistance period from a time point at which the parking assistance start button is operated to a time point at which the parking position registration switch is operated in the involatile memory 10*d* while associating the feature point information with the registered parking point. It should be noted that the target parking point registration section may store the "object position with respect to the vehicle" that is obtained by fusing "the feature point information and the sonar object information" obtained in the parking assistance period in the involatile memory 10*d*. As a result, a space occupied by the vehicle HV that is parked at the registered parking point is stored in the involatile memory 10*d* as the registered parking position while being associated with the feature point information and the registered parking point.

When the driver desires to park the vehicle HV into "the registered target parking position corresponding to the registered parking point" from a position near the registered parking position (i.e., a position in the vicinity area of the registered parking point) after the registered parking point and the registered parking position are registered, the driver inputs an instruction indicating such driver's desire using the display 93. When this instruction is input, the parking assistance execution section performs a "parking assistance control after the registration of the registered parking point (i.e., an automatic parking)".

Specifically, the parking assistance execution section obtains, as "actual feature point information", the feature point information from the driving assistance ECU 10, every time a predetermined time elapses. The parking assistance execution section moves the vehicle HV to the registered target parking position by letting the vehicle travel in such a manner that a "positional relationship between the vehicle HV and the grouped feature points" represented by the actual feature point information coincides with a "positional relationship between the vehicle HV and the grouped feature points" represented by the registered feature point information by comparing the actual feature point information and the registered feature point information. In this case, the parking assistance execution section transmits instruction signals to the power train ECU 30, the brake ECU 40, and the steering ECU 50.

The above-described "parking assistance control after the registration of the registered parking point" is sometimes referred to as a "path memorized type automatic parking control", for convenience. The path memorized type automatic parking control is also known, and is disclosed in Japanese Patent 7176421 and Japanese Patent Application Laid-Open No. 2023-176547.

It should be noted that, even after the registered parking point and the registered parking position are registered, the driver can move the vehicle HV to the registered parking position by manual driving. Specifically, when the driver desires to park the vehicle from the "vicinity area of the registered parking position (i.e., the position in the vicinity area of the registered parking point)" to the "registered parking position corresponding to the registered parking point" by manual driving after the registered parking point and the registered parking position are registered, the driver inputs an instruction indicating such driver's desire using the display 93. When this instruction is input, the parking assistance execution section instructs the driver how to operate the acceleration peal, the brake pedal, the shift lever, and the steering wheel, for the vehicle to move in such a manner that the actual feature point information coincides with the registered feature point information.

As has been described, according to the implementing apparatus, with respect to the normal action required stationary object for which the the obstacle contact avoidance control is preferably executed at an early timing, the obstacle contact avoidance control is executed when the vehicle approaches the normal action required stationary object to the first distance threshold D1th. Whereas, the driver feels annoyed by the obstacle contact avoidance control, if the obstacle contact avoidance control is executed relatively early for the action suppression stationary object. Thus, according to the implementing apparatus, with respect to the action suppression stationary object, the obstacle contact avoidance control is (finally) executed when the vehicle approaches the action suppression stationary object to the second distance threshold D2th smaller than the first distance threshold D1th. Thus, the frequency that the driver feels annoyed by the obstacle contact avoidance control can be reduced. In addition, the driver himself/herself can set/designate which of the action suppression stationary object or the action suppression stationary object, the stationary object is. Therefore, the obstacle contact avoidance control can be started at a timing in accordance with the driver's preference.

It should be noted that the present disclosure is not limited to the above embodiment, and may adopt various modifications within the scope of the present disclosure. For example, the present disclosure can be applied to an autonomous driving vehicle, when the vehicle driving mode of that autonomous driving vehicle is changed from an autonomous driving mode to a mode where the driver manually drives that autonomous vehicle. Furthermore, at S425, the CPU may determine whether or not the vehicle HV has moved to a position which is out of the parking space from the parking space (i.e., the vehicle has got out of the parking space completely).

What is claimed is:

1. A vehicle control apparatus comprising a controller configured to perform an obstacle contact avoidance control for a vehicle, when the vehicle approaches to a stationary object which is an object located stationarily in a specific place while the vehicle is moving in the specific place, wherein, the controller is configured to:

store information on the stationary object while distinguishing the stationary object between a normal action required stationary object and an action suppression stationary object;

execute the obstacle contact avoidance control that is automatic braking control to apply a brake force to said vehicle, using the stored information, when a distance between the vehicle and the normal action required stationary object becomes equal to or shorter than a first distance threshold; and execute the obstacle contact avoidance control that is the automatic braking control, using the stored information, when a distance between the vehicle and the action suppression stationary object becomes equal to or shorter than a second distance threshold which is smaller than the first distance threshold.

2. The vehicle control apparatus according to claim 1, wherein, the controller is configured to:

cause a display which the vehicle includes to display an image in which the stationary objects are superimposed on a viewpoint image which is an image of the vehicle viewed from a predetermined viewpoint above the vehicle; and let a driver select one of the displayed stationary objects and designate which of the normal action required stationary object and the action suppression stationary object, the selected stationary object is.

3. The vehicle control apparatus according to claim 2, wherein, the controller is configured to execute the obstacle contact avoidance control, using the stored information, when a distance between the vehicle and a non-stationary object which is neither the action suppression stationary object nor the normal action required stationary object becomes shorter than a third distance threshold which is equal to or greater than the first distance threshold.

4. A vehicle control method for performing an obstacle contact avoidance control for a vehicle, when the vehicle approaches to a stationary object which is an object located stationarily in a specific place while the vehicle is moving in the specific place, comprising:

a step of storing information on the stationary object while distinguishing the stationary object between a normal action required stationary object and an action suppression stationary object;

a step of executing the obstacle contact avoidance control that is automatic braking control to apply a brake force to the vehicle, using the stored information, when a distance between the vehicle and the normal action required stationary object becomes equal to or shorter than a first distance threshold; and a step of executing the obstacle contact avoidance control that is the automatic braking control, using the stored information, when a distance between the vehicle and the action suppression stationary object becomes equal to or shorter than a second distance threshold which is smaller than the first distance threshold.

5. A non-transitory storage medium storing a program, the program causing a computer mounted on a vehicle to implement:

a step of storing information on a stationary object which is an object located stationarily in a specific place while distinguishing the stationary object between a normal action required stationary object and an action suppression stationary object;

a step of executing an obstacle contact avoidance control that is automatic braking control to apply a brake force to the vehicle, using the stored information, when a distance between the vehicle and the normal action required stationary object becomes equal to or shorter than a first distance threshold; and a step of executing the obstacle contact avoidance control that is the automatic braking control, using the stored information, when a distance between the vehicle and the action suppression stationary object becomes equal to or shorter than a second distance threshold which is smaller than the first distance threshold.

* * * * *